United States Patent
Vallieres et al.

(10) Patent No.: US 9,787,663 B2
(45) Date of Patent: Oct. 10, 2017

(54) REPLAYING A BATCH OF SECURE COMMANDS IN A SECURE CHANNEL

(71) Applicant: OBERTHUR TECHNOLOGIES, Colombes (FR)

(72) Inventors: Jean-Philippe Vallieres, Colombes (FR); Sebastien Nerot, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 81 days.

(21) Appl. No.: 14/879,449

(22) Filed: Oct. 9, 2015

(65) Prior Publication Data

US 2016/0105411 A1    Apr. 14, 2016

(30) Foreign Application Priority Data

Oct. 13, 2014  (FR) .................................. 14 59800

(51) Int. Cl.
*H04L 29/06* (2006.01)
*H04L 9/08* (2006.01)
*H04L 9/12* (2006.01)
*H04L 9/32* (2006.01)

(52) U.S. Cl.
CPC ............ *H04L 63/08* (2013.01); *H04L 9/0838* (2013.01); *H04L 9/12* (2013.01); *H04L 9/32* (2013.01); *H04L 63/06* (2013.01); *H04L 67/42* (2013.01)

(58) Field of Classification Search
CPC ....... H04L 9/0838; H04L 9/085; H04L 9/088; H04L 63/08
See application file for complete search history.

(56) References Cited

U.S. PATENT DOCUMENTS

| | | | |
|---|---|---|---|
| 2004/0148502 A1 | 7/2004 | Gollner et al. | |
| 2009/0215490 A1* | 8/2009 | Lee | G06K 19/0701 455/558 |
| 2011/0010720 A1* | 1/2011 | Smith | G06F 21/00 718/102 |
| 2012/0144193 A1* | 6/2012 | Le Saint | H04L 9/3234 713/168 |
| 2012/0159502 A1 | 6/2012 | Levin et al. | |
| 2013/0077781 A1* | 3/2013 | Daemen | H04L 9/0861 380/44 |
| 2014/0089556 A1* | 3/2014 | Ballard | G06F 13/385 710/316 |

OTHER PUBLICATIONS

French Search Report date Jun. 12, 2015, corresponding to the Foreign Priority Application No. 1459800.

* cited by examiner

*Primary Examiner* — David Pearson
(74) *Attorney, Agent, or Firm* — Young & Thompson

(57) ABSTRACT

An intermediary third-party receives, from a master device, a batch of pre-generated secure commands; plays it so as to send sequentially, to a slave device, the commands. The batch includes an initial command indicating the establishment of a channel secured with a session key dependent on a sequence counter, and second commands protected by a MAC code that is a function of the session key. An update of the sequence counter in non-volatile memory of the slave on each new establishment of a secure channel renders the pre-generated batch obsolete by virtue of a new session key. In order to allow the batch to be replayed, the invention provides for each update value of the counter to be temporarily stored in volatile memory, and for the current value to be overwritten in non-volatile memory on predefined events, including a test counter reaching a maximum number of replays.

21 Claims, 11 Drawing Sheets

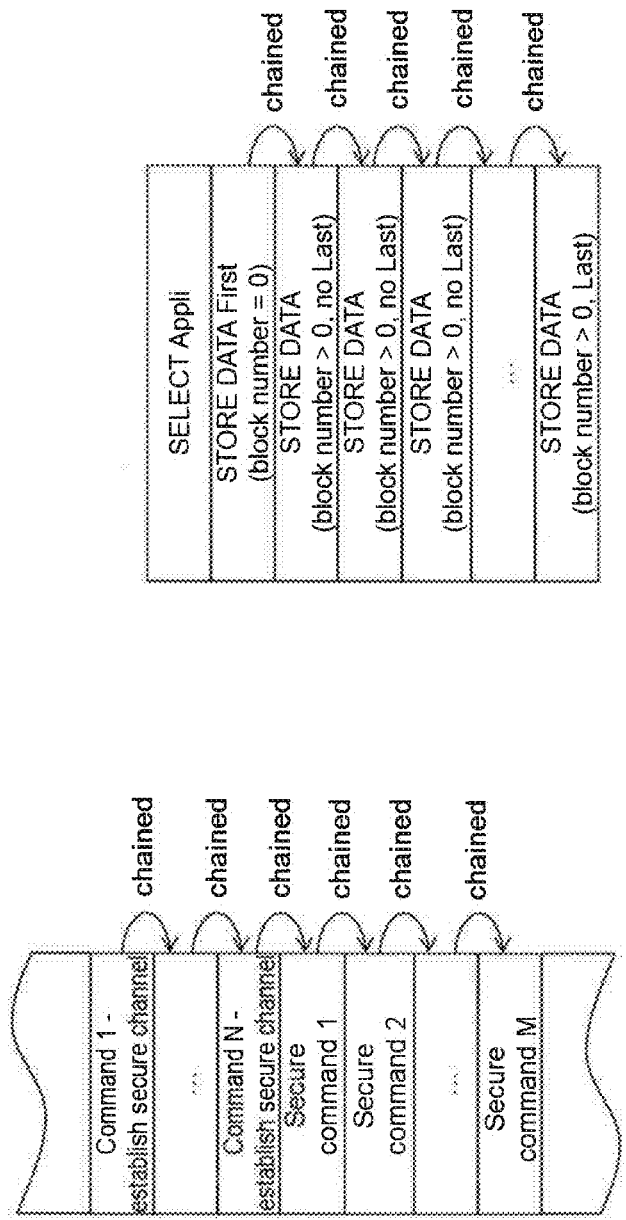
Fig. 1A
Fig. 1
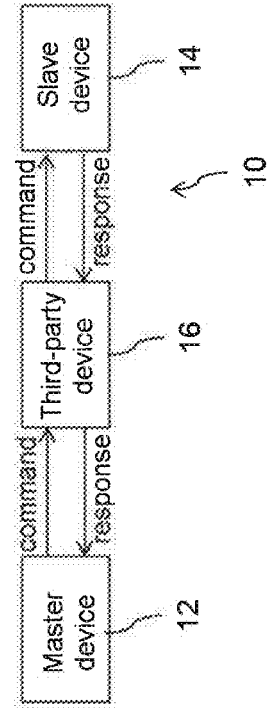
Fig. 2

REPLAYING A BATCH OF SECURE COMMANDS IN A SECURE CHANNEL

This patent application claims priority over the French application no 14/59800 dated 13 Oct. 2014, which is incorporated by reference.

FIELD OF THE INVENTION

The present invention relates to the field of communications and, more particularly, that of communications between a master device, for example a server, and a slave device, for example a client.

CONTEXT OF THE INVENTION

Two communicating entities define a communication layer for exchanging messages. This communication layer is often defined using a so-called secure channel protocol that makes it possible to offer different levels of protection for the communications and the data, for example in terms of authentication of the entities, of integrity of the data and of confidentiality.

Such a protocol is widely used in the chip card industry for exchanging data in a master-slave relationship. The master initiates the communication channel then the communication by sending commands to the slave, the slave simply responding thereto.

By way of illustration, the chip card, and generally any secure element (SE), integrated circuit card (ICC), universal integrated circuit card (UICC) or even embedded universal integrated circuit card (eUICC), can act as slave, for example in "server" mode in a client/server context. A remote equipment item can act as master and therefore as "client" in a client/server context.

To achieve a high level of security, the secure channel protocols implement security mechanisms which rely on one or more dynamic variables, that is to say on variables which evolve over time.

The commands and messages exchanged between the master and the slave are then generated on the basis of this or these dynamic variable(s), possibly via session keys, thus preventing them from being replayed if the dynamic variables (and therefore the session keys in the example) have changed.

For example, these dynamic variables can include random unknowns exchanged between the master and the slave in an authentication process (of challenge-response type), and/or include a sequence counter which is incremented each time a secure channel is newly established between the two entities. Such is for example the case in the SCP02 and SCP03 protocols (secure channel protocol 02 and 03) that are widely used in the chip card industry and defined in the GlobalPlatform standard.

In these protocols, the dynamic variables are used to generate one or more session keys used to authenticate and/or encrypt the data exchanged and to generate a message authentication code (MAC). The commands are thus secured or protected.

In many of these secure channel protocols, the different secure commands sent by the master (as for the secured responses sent by the slave) are chained such that the generation of the command (of the response) N+1 requires the preceding command (response) N to be valid.

For example, the authentication code of a message (command or response) can be of CBC-MAC type (CBC standing for "Chained Block Ciphering") in which the initialization value is the CBC-MAC of the preceding message.

Similarly, the CBC encryption of the data can involve an internal counter which is incremented for each new command, such that, in one and the same secure channel, the secure commands are different even if the data that they contain are the same.

The aim of the chaining is to ensure that the secure commands (responses) are sent and processed in a planned order. It also allows for easier detection of commands (responses) that are not planned (for example a reset command), for example sent by a malicious person.

The explanations below rely mainly on examples in which the commands are chained. However, the present invention is not limited to such chained commands.

Some of the secure channel protocols make it possible to pre-generate secure commands, without at this stage requiring preceding commands or responses. For this, the entity concerned, generally the master, has mechanisms available enabling it to predict (or simulate or reproduce) the behavior of the other entity, here the slave, notably how the dynamic variables and the responses that the slave should generate change. This is called a secure channel protocol predictive mode.

For example, the data necessary to the predictive mode can comprise one or more secret keys shared between the master and the slave, from which the session keys are generated; the dynamic variables, typically a sequence counter incremented for each newly established secure channel, also making it possible to generate the session keys; also, the algorithms that make it possible to predict (or pre-generate) pseudo-random values used in authentication exchanges (challenge-response).

The predictive mode is often used by the master device to pre-generate a batch (or set or bundle or series) of secure commands, generally chained, which are packed in a file or "script" or "batch" as shown in FIG. 1. In the batch of this figure, the first command makes it possible to initiate and establish a secure channel, the next command, which is secured, contributes to an authentication mechanism, then the other secure commands aim to drive particular processes within the slave device.

FIG. 1A shows another example of a batch of commands secured without authentication process. The SELECT APPLICATION command is optional because it can be performed in a decorrelated manner, before the batch of the secured STORE DATA commands. Furthermore, it includes no indication as to any securing of the communication channel.

Thus, the first secured STORE DATA command (identifiable from the block number=0 contained in the parameter P2) is the first command indicating the establishment of a secure channel, because its CLA field contains an indication that it is secure.

The other STORE DATA commands are also secured and chained.

In practice, command scripts are used when the master and slave devices are relatively remote and there are one or more intermediate entities, or third-party devices, interposed between them, as shown in FIG. 2. Thus, a third-party device directly linked (for example implementing the SSL—Secure Socket Layer—protocol) with the slave device interacts therewith on behalf of the master device.

By way of example, the third-party device can be an application (and/or system) implemented in a terminal in which the slave device (SE, UICC, etc.) is embedded, notably a midlet (application) responsible for waking up the slave device before communicating with it. As a variant, the third-party device can be any machine in a communication network, that is to say a transport intermediary.

The third-party device is not necessarily a trust device. Notably, it does not have data available ensuring the protection of the secured channel (in fact of the secure commands of the batch), in particular the shared secrets, the session keys, the algorithms used, etc.

In practice, the third-party device is responsible for transferring the commands and any secured responses, because it does not know these data ensuring the protection of the secure channel and is therefore incapable of processing the duly transferred commands and responses. Furthermore, it can check a general command processing status in order to determine whether the commands have been processed successfully, and can return to the master device, at the end of the processing, a general status message indicating, for example, the number of commands transmitted. The master device can thus take decisions based on the general status message received.

In the context of batches of commands, the third-party device can act as command timer, whereby it decides to send the commands to the slave device at an appropriate moment, for example at times when there are few communications with the slave device. Thus, the master device may receive the general status message only several days after having sent the command script to the third-party device.

Furthermore, or as a variant, the transfer of the commands can be done regularly, for example in a manner similar to the CRON or CRONTABLE techniques of a Unix system.

The predictive mode of a secure channel protocol is used during chip production steps (slave device) in order to speed up the production process. In effect, the pre-generated commands can thus be sent in a batch, minimizing the command processing time.

Another use of the predictive mode relates to the components (cards, SE, eUICC) deployed, for example SIM cards of a telephone operator or secure elements with which remote reading devices are equipped (machine-to-machine). In this case of deployment, it is difficult to establish a continuous communication link (because of a firewall, of a demilitarized IT zone DMZ, etc.). It may then prove advantageous to transmit the batch of commands to a third-party device in proximity to the slave component. The OTA (Over-The-Air) methods are known in particular in the mobile industry where an operator (the master) pre-generates a series of commands for the SIM cards (slaves) of the subscribers in order to program/reconfigure them. This series of commands can be delivered at any time to a third-party device, generally the subscriber's terminal, responsible for transmitting the commands to the target SIM card.

The diagram of FIG. 3 illustrates a conventional use of a batch of commands in the system of FIG. 2.

In this example, the master device generates a batch of commands to be sent to the slave device, for example that of FIG. 1 in which the batch of commands includes a command, called first command (for example the initialization command INITIALIZE UPDATE according to SCP03), indicating the establishment, with the slave device, of a communication channel secured by at least one session key (for example the key S-MAC according to SCP03), this session key being dependent on a current value of a dynamic variable shared between the master device and the slave device, and includes at least one command, called second command, secured (or protected) by a message authentication code computed using the session key.

This generation implements the predictive mode of the secure channel protocol, involving the update of the shared dynamic variable (the sequence counter in SCP03).

Thus, the third-party device which receives, from the master device, the batch of commands to be sent to the slave device, plays it so as to send, to the slave device, said commands of the batch sequentially, command by command, as long as no error is detected. As shown in the figure, playing the batch of commands amounts to looping on each command, for the latter to be sent and a response to be returned (generally an execution status message).

The secure channel is closed as soon as an error occurs. An example of an error is the expiration of a timer (timer out) after the sending of a command for which no response is received, or an error message returned by the slave device.

For its part, the slave device receives the commands sequentially, that is to say without being aware of the existence of a batch or a script of commands played by the third-party device.

Thus, the slave device receives, from the third-party device, at least one command, called first command, indicating the establishment of a communication channel secured by at least one session key; computes an update value of the dynamic variable or variables (notably the sequence counter) from a current value of the dynamic variable or variables stored in non-volatile memory; generates the session key from the computed update value. Then, given the sequential sending (loop) of the commands, the slave device also receives, from the third-party device, at least one command, called second command, secured by a message authentication code (of C-MAC type according to SCPP03); and checks the message authentication code using the session key before executing said second command.

Generally, the slave device returns an execution status message (sometimes data) in response to each command processed.

Different situations may cause the third-party device to send a command batch execution failure status, and therefore lead to the closure of the secure channel: absence of response from the slave device to the commands, error message received from the slave device, powering down of the slave device for example as a result of a lack of battery power, etc.

When the master device receives such a failure status message, it may want to re-execute the same commands, although the secure channel has been closed. Now, the dynamic variables from which the security mechanisms of the secure channel are defined have changed: the session keys of a new secure channel will be different from those of the secure channel which has just been closed. Thus, it is conventional practice for the master device to have to generate, in predictive mode, a new batch of the same commands, but by re-computing authentication codes and by re-encrypting the command data using new predicted session keys.

Now, this situation is not satisfactory because, for the batch of commands to be executed successfully, new connections, new cryptographic processes (and therefore costly processes) are necessary for the master device to be able to generate the new batch of commands. This reduces the capacity of the master device to process other requests or standard operations.

Furthermore, given the fact that the processing of the batch of commands by the third-party device and the slave device may be decorrelated, in time, from the sending of this same batch by the master device, the latter is informed late of the failure, thus leading to a significant loss of time (sometimes in days) for the master device. This loss of time can for example prove prejudicial if updates have to be made, for each batch of commands, in a fleet of deployed components. In effect, this situation reduces the capacities of the master device to rapidly program or control the fleet of components geographically deployed.

This prejudice is all the greater since the reasons for the failure of the execution of the batch of commands may be minimal and sometimes highly localized: attempted hack by a malicious person, disturbance (for example interference) on the communication link between the third-party and slave devices, etc.

The present invention aims to resolve all or some of the drawbacks described previously.

SUMMARY OF THE INVENTION

In this context, the invention proposes a communication method comprising, on a slave device, the steps described above, and also the following steps:
incrementing, by a positive or negative increment (also known as "decrementing"), a test counter on reception of the first command indicating the establishment of a secure communication channel; and
overwriting the current value of the dynamic variable in non-volatile memory with the computed update value when the test counter reaches a threshold value. In other words, storing the computed update value (of the dynamic variable), in non-volatile memory, as new current value of the dynamic variable when the test counter reaches a threshold value.

By virtue of the use of a test counter which delays the physical updating of the dynamic variable in non-volatile memory (and therefore before any new secure channel requires new data ensuring the protection of the secure channel, for example new session keys, and therefore before the batch of commands is obsolete), the slave device makes it possible for the third-party device to be able to carry out a number of tries on the set of commands to be executed by the slave device. In effect, the session keys of the secure channels established upon these replays are the same. This plurality of tries notably makes it possible to overcome any hacks and/or communication disturbances in order to execute all the batch of commands.

Thus, the replaying of a batch of commands by the third-party device is possible, which reduces the recourse to the master device for this full execution. The number of connections, the quantity of cryptographic processes required of the master device and the time needed for this full execution are therefore reduced. Furthermore, the master device is more available to process other commands.

The validation of the update of the shared dynamic variable by switching over the update value as new current value in non-volatile memory is also known as "commitment".

Symmetrically, the invention also provides a communication method comprising, on a third-party device, the steps described above, and also the following step:
replaying the batch of commands as long as the third-party device does not receive, from the slave device, an indication of an update of the current value of the dynamic variable by the slave device. In other words, as long as the third-party device does not receive, from the slave device, a command batch replay loop exit event.

As will be seen hereinbelow, the indications can be indirect, that is to say implicit in the information transmitted.

The invention allows for a controlled replay of a batch of secure commands by virtue of the recognition of an indication from the slave device concerning the effective updating, or not, of the shared dynamic variable from which the security protections of the secure channel are established.

This behavior of the third-party device thus allows a slave device to use a test counter as described above, in order to reduce the recourse to the master device to successfully execute all of the batch of commands.

Correlatively, the invention relates also to a processing device, for example a chip card, comprising a non-volatile memory storing a current value of a dynamic variable, and a processor configured to:
receive, from a third-party device, at least one command, called first command, indicating the establishment of a communication channel secured by at least one session key;
compute an update value of the dynamic variable from the current value stored in non-volatile memory;
generate the session key from the computed update value;
receive, from the third-party device, at least one command, called second command, secured by a message authentication code; and check the message authentication code using the session key before executing said second command;
characterized in that the processing device further comprises a test counter, and the processor is further configured to:
increment the test counter on reception of the first command indicating the establishment of a secure communication channel; and
overwrite the current value of the dynamic variable in non-volatile memory with the computed update value when the test counter reaches a threshold value.

Symmetrically, the invention also relates to a processing device comprising a processor configured to:
receive, from a master device, a batch of commands to be sent to a slave device, the batch of commands including a command, called first command, indicating the establishment, with the slave device, of a communication channel secured by at least one session key dependent on a current value of a dynamic variable shared between the master device and the slave device, and at least one command, called second command, secured by a message authentication code computed using the session key;
play the batch of commands so as to send, to the slave device, said commands of the batch sequentially, command by command, as long as no error is detected;
characterized in that the process is further configured to:
replay the batch of commands as long as the processing device does not receive, from the slave device, an indication of an update of the current value of the dynamic variable by the slave device.

Also, the invention proposes a system comprising a slave device as defined above, a third-party device as defined above, and a master device configured to generate and send the batch of commands to the third-party device.

Another subject of the invention is a computer program product comprising instructions suitable for implementing each of the steps of one of the methods described previously when said program is run on a computer.

The devices and computer program product according to the invention offer advantages similar to those explained previously in conjunction with the methods.

Other features of the methods and devices according to embodiments are described in the dependent claims, essentially using a method terminology, that can be transposed to the devices.

In one embodiment, the step of computing an update value comprises the storage of the computed update value in a volatile memory of the slave device.

This arrangement guarantees that the current value of the dynamic variable is not modified by the value or values computed for its update. Thus, the possibility of establishing one or more secure channels is retained using the same current value of the dynamic variable, that has remained unchanged in non-volatile memory. The result thereof is that the replaying, by the third-party device, of a batch of commands requiring the establishment of such a secure channel is made possible and is guaranteed.

In another embodiment, the current value of the dynamic variable in non-volatile memory is overwritten in non-volatile memory with the computed update value when the last secure command of all of the second secure commands (for example via an indicator in the command concerned) comprises a validly verified message authentication code and is executed successfully.

This situation corresponds to the full execution of the secure commands of the batch. The secure channel is now no longer necessary and can be closed, in which case the dynamic variable or variables can be physically updated in order for the next secure channels to be established with new security data (session keys for example). This situation is an example of a replay loop exit event, because such a replay proves useless given the successfully completed execution.

In a particular embodiment, the method (on the slave device side) further comprises the following step: transmitting, to the third-party device and in response to said last secure command, a message comprising an indication that the execution of said second command or commands of the batch has been carried out successfully. This indication notably makes it possible for the third-party device to be indirectly informed of the effective updating of the dynamic variable (the sequence counter in SCP03) in non-volatile memory of the slave device.

In yet another embodiment, the current value of the dynamic variable in non-volatile memory is overwritten in non-volatile memory with the computed update value when one said second command whose message authentication code has been checked successfully leads to an error or exception of execution of this second command, such as, for example, when a host cryptogram (authentication procedure described hereinbelow) is declared invalid upon an EXTERNAL AUTHENTICATE command (in SCP03) or when the decrypted command proves incorrect. These situations are examples of a replay loop exit event, because, in these situations, the replaying of the same command will lead to the same error: the replaying of the batch of secure commands therefore proves useless.

This configuration forces the effective updating of the dynamic variable in non-volatile memory (commitment or switchover), and therefore now makes it impossible to replay the batch of commands, because the execution error or exception reflects an error intrinsic to the secure commands of the batch, which will not be able to be corrected by a simple replay, but by the master device by generating a new batch of the same commands. The provision proposed here therefore makes it possible to avoid a loss of time linked to the replaying of a batch of commands that is intrinsically incorrect.

In one particular embodiment, the method (on the slave device side) further comprises the following step: transmitting, to the third-party device and in response to said second command leading an execution error or exception, a message comprising an indication of the execution error or exception despite a successfully checked message authentication code. This indication also makes it possible for the third-party device to be indirectly informed of the effective updating of the dynamic variable (sequence counter in SCP03) in non-volatile memory of the slave device.

It will be understood from these various provisions that the commitment or switchover of the dynamic variable (the sequence counter in SCP02 or SCP03 for example) takes place only when one of the replay loop exit events (reaching the counter threshold value, end of the batch of commands, detection of an incorrect command in the batch despite its authenticity and its integrity) occurs. Excluding such events, the batch of commands can be replayed if an unexpected error occurs, and for as long as the number of tests allowed is not reached.

In one embodiment, the test counter is reset to a default value when the current value of the dynamic variable in non-volatile memory is overwritten with the computed update value. For example, this default value, stored in EEPROM memory, may be modifiable in time.

This provision makes it possible to reconfigure the system for a new series of replays of a new batch of commands, the commands of this new batch needing to have been secured using the dynamic variable as effectively updated (that is to say with the new current value).

In a particular embodiment, the step consisting in overwriting the current value in non-volatile memory with the computed update value and the step consisting in resetting the test counter are performed before the step of generating the session key from the computed update value.

This provision guarantees a strong security of the method according to the invention, by reducing the risks that a malicious person can indefinitely replay a set of operations by the slave device, because the commitment or switchover of the dynamic variable is performed as early as possible in the secure channel initialization procedure.

Notably, the storage step can precede the incrementation step.

In a particular embodiment, the step consisting in overwriting the current value in non-volatile memory with the computed update value and the step consisting in resetting the test counter are performed in an atomic step.

This provision makes it possible to significantly reduce the risks of desynchronization between the dynamic variable and the test counter, and consequently the possibilities for a malicious person to indefinitely replay the batch of commands.

In one embodiment, said first command is one said second command secured by a message authentication code. An indication of the implementation of a channel securing mechanism (encryption and MAC by key) can be provided in an insecured, and therefore readable, field (for example the CLA code in SCP03) of the command header, making it possible to trigger the generation of the session keys to decrypt the command and check the MAC code.

In an embodiment relative to the third-party device, receiving the indication of an (effective) update of the (shared) dynamic variable by the slave device comprises receiving, from the slave device, a current value of the dynamic variable and comparing the current value received with a local value of the dynamic variable. The third-party device can thus directly check whether the slave terminal has updated, publicly, its dynamic variable by comparison with the last (local) value it has knowledge.

Notably, the current value of the dynamic variable can be received, by the third-party device, in a response from the slave device to the first command. This provision is based on the existing protocols without modification, while requiring few additional processes for the third-party device. In effect, it is conventional for the sequence counter (that is to say a shared dynamic variable in the SCP02 and SCP03 cases) to be returned in response to the initialization command (INITIALIZE UPDATE in these same protocols), making it possible for the third-party device, by simple comparison with the last value of the counter of which it has knowledge, to effectively determine whether an effective update (commitment) of the sequence counter has taken place or not in the interval.

In another embodiment, the indication of an update of the current value (thus making it possible to decide to replay a current batch of commands) comprises an indication that the execution of said second command or commands of the batch by the slave device has been carried out successfully.

In another embodiment, the indication of an update of the current value comprises an indication that the execution, by the slave device, of a second command of the batch whose message authentication code has been checked successfully has led to an error of this second command. As explained above, this configuration includes the case where the checking of the host cryptogram of the EXTERNAL AUTHENTICATE command (SCP03) has failed despite a valid MAC code.

Preferentially, the three exemplary indications defined above for the third-party device (current value, indication of success or of an error despite a valid MAC code) are the only replay loop exit events from which the third-party device knows that it cannot replay the batch of commands. In effect, as explained above, the shared dynamic variable has, in these cases, been updated, which means that the MAC authentication codes even the encryptions of the commands in the current batch are now desynchronized from the new session keys.

In another embodiment, receiving the indication of an (effective) update of the dynamic variable by the slave device comprises receiving, from the slave device, an error message (for example 0x6982 in SCP03 from GlobalPlatform) in response to one said second command immediately subsequent to the first command, the error message indicating an incorrect message authentication code for said second command immediately subsequent to the first command.

In this configuration, the third-party device considers that if, from the first command protected by an MAC code (based on the dynamic variable, via the session keys), the MAC code is incorrect (error message 0x6982 in the GlobalPlatform standard), then it is probable that the session keys (and consequently the dynamic variable) are not those provided for the MAC codes generated previously in the batch of commands. It is in fact probable that the dynamic variable has been incremented on the part of the slave device resulting in a desynchronization with the batch of commands predicted previously. It will be understood that this provision is not optimal because a MAC code error may also result from a disturbance of the communication channel.

In one embodiment, the message authentication codes of a number of second commands are chained, notably in as much as the computation of the MAC authentication code of a subsequent second command depends on the MAC code of a preceding second command. This provision secures the execution of the batch of commands against attacks aiming to insert unpredicted commands or disrupt the order of the commands defined in the batch.

BRIEF DESCRIPTION OF THE FIGURES

Other particular features and advantages of the invention will become more apparent from the following description, illustrated by the attached drawings, in which:

FIGS. 1 and 1A illustrate examples of batches of pre-generated commands;

FIG. 2 schematically represents a system in which embodiments of the invention are implemented;

DETAILED DESCRIPTION OF THE INVENTION

Figure 3:
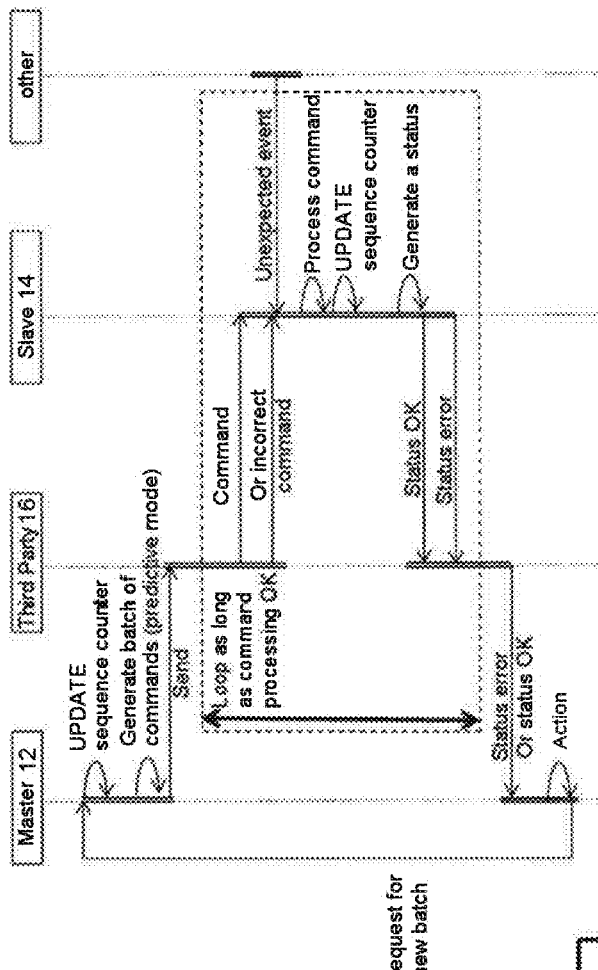
FIG. 3 illustrates a conventional use of a batch of commands in the system of FIG. 2.

FIG. 2 illustrates, schematically, an exemplary system in which embodiments of the present invention can be implemented. The system 10 comprises a master device 12, for example a server of a telephone operator, and a slave device 14, for example a SIM card, that the telephone operator wants to update. The slave device 14 is for example embedded in a mobile terminal, acting as third-party device 16 in exchanges between the master 12 and slave 14 devices. Other intermediate devices (not represented) between the master 12 and slave 14 devices may exist in the context of the invention.

In this example, the server of the telephone operator is called "master" because it initiates exchanges with the SIM card, which is therefore "slave". To perform these exchanges, the master device initiates a secure channel, for example according to the SCP03 protocol, then sends a series of commands to the SIM card. Other protocols and degraded modes of SCP02 and SCP03 consider dispensing with a secure channel initialization procedure, and allowing secure commands to be sent directly. In this case, the first secure command indicates that a secure channel is implicitly established, generally based on secrets shared between the master and the slave.

The link between the master device 12 and the third-party device 16 may be wired (Ethernet connection) or wireless (mobile network). In the example where the third-party device 16 is a terminal embedding a SIM card 14, the communication link between these two entities is of the contact type. Obviously, contactless (wireless) variants can be envisaged.

Figure 4:
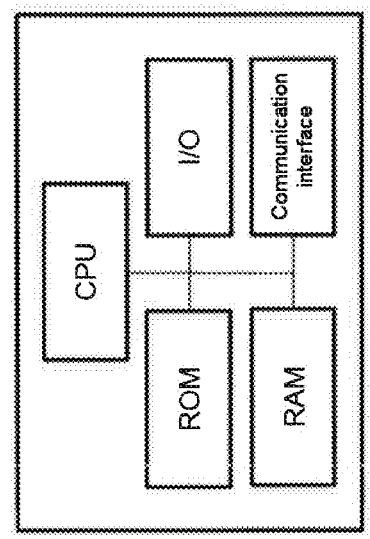
FIG. 4 illustrates an exemplary hardware architecture of each constituent device of the system described with reference to FIG. 2.

FIG. 4 illustrates an exemplary hardware architecture of each constituent device of the system described with reference to FIG. 2.

In this example, the device, that is to say the SIM card 14 or the terminal 16 or the server 12, comprises a communication bus to which are linked:

- a processing unit—or microprocessor—denoted CPU (Central Processing Unit);
- one or more non-volatile memories, for example ROM (Read Only Memory) that can constitute a support in the meaning of the invention, that is to say that can comprise a computer program comprising instructions for the implementation of a method according to an embodiment of the invention. This non-volatile memory may also be an EEPROM (Electrically Erasable Read Only Memory) or even a Flash memory. Notably, this non-volatile memory of the slave device 14 stores the current value of the shared dynamic variable or variables, for example of the sequence counter in the SCP02 or SCP03 case described hereinbelow;
- a random access memory or cache memory or volatile memory, for example RAM (Random Access Memory), comprising registers suitable for storing variables and parameters created and modified during the execution of the abovementioned program; upon the implementation of the invention, the codes of instructions of the program stored in read-only memory ROM are loaded into RAM memory in order to be executed by the processing unit CPU;
- a communication interface suitable for transmitting and receiving data, for example via a telecommunication network or a read/write interface of a secure element;
- an input/output interface I/O, for example a screen, a keyboard, a mouse or another pointing device such as a touch screen or a remote control; this I/O interface enables the user to interact with the system while the method is being implemented via a graphical interface.

The communication bus allows the communication and interoperability between the different elements included in the equipment or linked thereto. The representation of the bus is not limiting and, notably, the processing unit is able to communicate instructions to any element of the equipment directly or via another element of this equipment.

Figure 5:
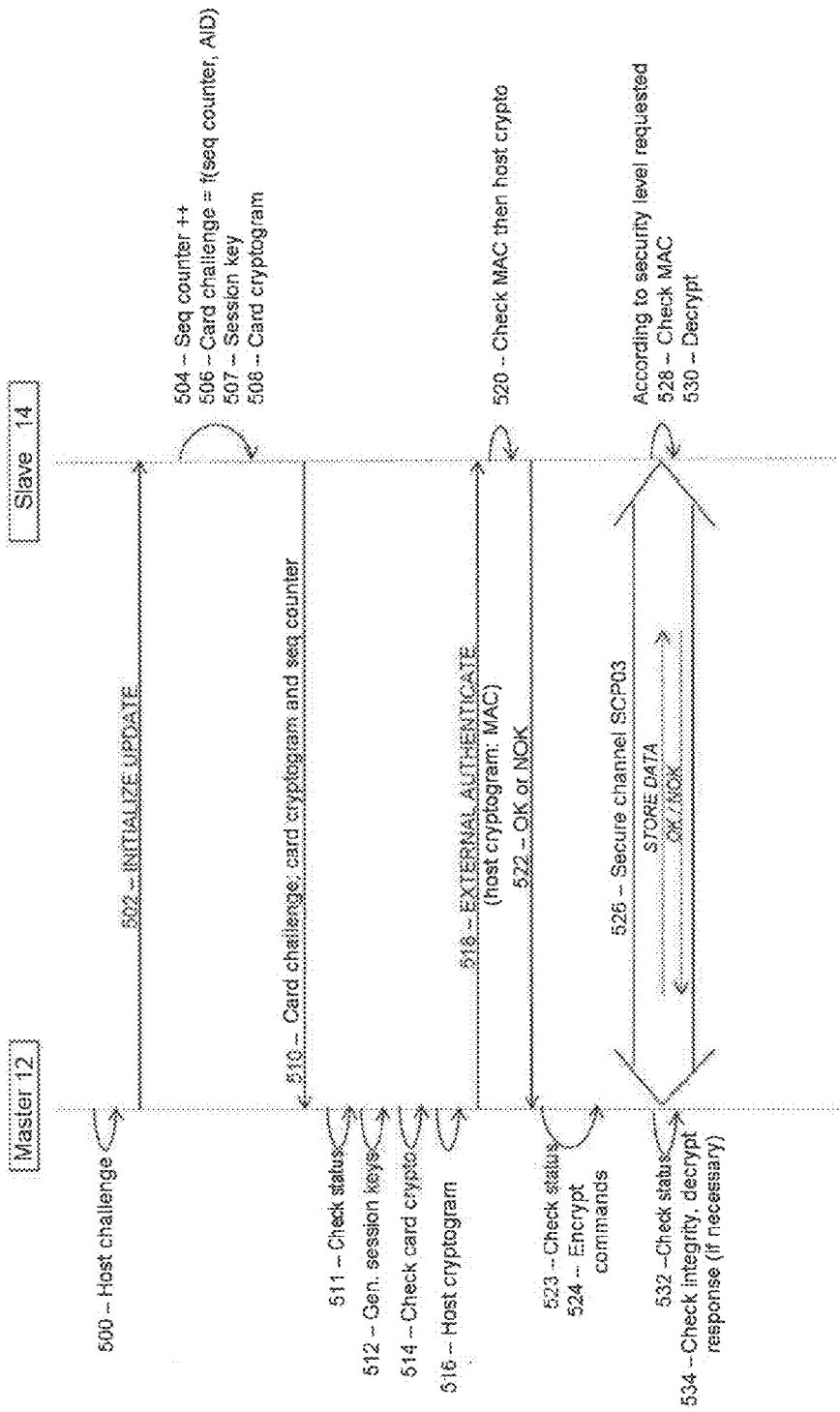
FIG. 5 schematically illustrates the conventional exchanges in accordance with the SCP03 protocol defined in GlobalPlatform.

FIG. 5 schematically illustrates the conventional exchanges in accordance with the SCP03 protocol defined in GlobalPlatform. It should be noted that, in the abovementioned predictive mode, all of the commands sent by the master device in this figure can be grouped in a batch of commands played by a third-party device, for example a terminal embedding a slave device of SIM card type.

As shown schematically in FIG. 1, these exchanges can comprise a first part dedicated to the establishing of a secure channel, involving an authentication procedure of "Challenge-Response" type that is well known. Although not illustrated, these commands intended for a target application of the slave device take place after an initial command selecting said target application, typically a SELECT command that is widely known. In a variant, no SELECT command is provided, an application of the slave device 14 being able to be selected by default (that is to say as long as no SELECT command for another application is received) when the slave device 14 is powered up.

Thus, the master device 12 generates, in the step 500, a host challenge (randomly or pseudo-randomly) that it transmits to the slave device 14 in the step 502, using an INITIALIZE UPDATE command.

On reception of this command, the slave device 14 updates, in the step 504, its sequence counter (on three bytes) by incrementation (the current value is incremented in non-volatile memory), then computes, in the step 506, a card challenge that is a function of the sequence counter and of an identifier (AID) of an application selected in the card. The generation of the card challenge is generally pseudo-random and predictive (for the master device 12 in the case of a predictive channel).

In the step 507, the slave device 14 generates the session keys (notably described in section 6 of the GlobalPlatform standard) for the secure channel, notably using the current value of the sequence counter, host and card challenges, and one or more static secrets shared between the master and slave devices.

In step 508, the slave device 14 computes an authentication cryptogram for the card, that is a function of the host and card challenges, and a constant (shared). For example, the cryptogram generation function can be the S-MAC algorithm based on one of the session keys generated.

The slave device 14 returns to the master device 12 the card challenge, the card cryptogram, and the current value of the sequence counter. This is the step 510.

On reception of these data, the master device 12 checks (511) the status of the response before continuing, indicated for example in the optional argument. If the status is positive (field SW=9000), the master device 12 generates, in the step 512, the session keys in a manner similar to the slave device 14.

Then, the master device 12 computes and checks the card cryptogram, by applying the same algorithm (shared) as that of the slave device 14. This is the step 514.

In the step 516, the master device 12 computes an authentication cryptogram for the host, that is a function of the session keys (which are themselves a function of the host and card challenges, the card challenge further being a function of the sequence counter in predictive mode), and of a constant (shared). For example, the cryptogram generation function can be the S-MAC algorithm based on one of the session keys generated.

This host cryptogram is sent to the slave device 14 by an EXTERNAL AUTHENTICATE command, which is protected in integrity and in authenticity by the addition of a MAC authentication code computed on the host cryptogram, using a MAC-dedicated session key. The sending corresponds to the step 518.

In the step 520, the slave device 14 checks the MAC code, then the host cryptogram received in order to confirm the creation of the secure channel (acknowledgement response 522). The master device 12 checks the status of the response received.

In parallel, or after positive verification of the status of the response, in the step 524, the master device 12 generates and optionally encrypts (using the session keys) one or more commands. Furthermore, a security MAC code is computed for each of them and then is added to them. The encryption of the commands and their MAC codes are generally, but not necessarily, chained in as much as each of them depends on the preceding one (and therefore initially on the MAC of the EXTERNAL AUTHENTICATE command).

Obviously, in the predictive mode, these commands, including their encryption and their MAC code, are predicted and therefore generated prior to the establishment of the secure channel.

The step 526 schematically represents the successive sending of these commands and the reception, by the master device 12, of their responses. For example, a command can be the STORE DATA command defined in GlobalPlatform for the storage of new data in non-volatile memory of the slave device 14.

For each of these secure commands, the slave device 14 checks the MAC code (step 528), then decrypts it (step 530) before executing it. In response to this execution, it returns a positive acknowledgement (OK, the field SW has the value 9000) or an error message (NOK), which is processed by the master device (step 532), even data encrypted and protected by MAC in which case the master device 12 checks their integrity (by the MAC code) then proceeds to decrypt them (534).

Figure 5A:
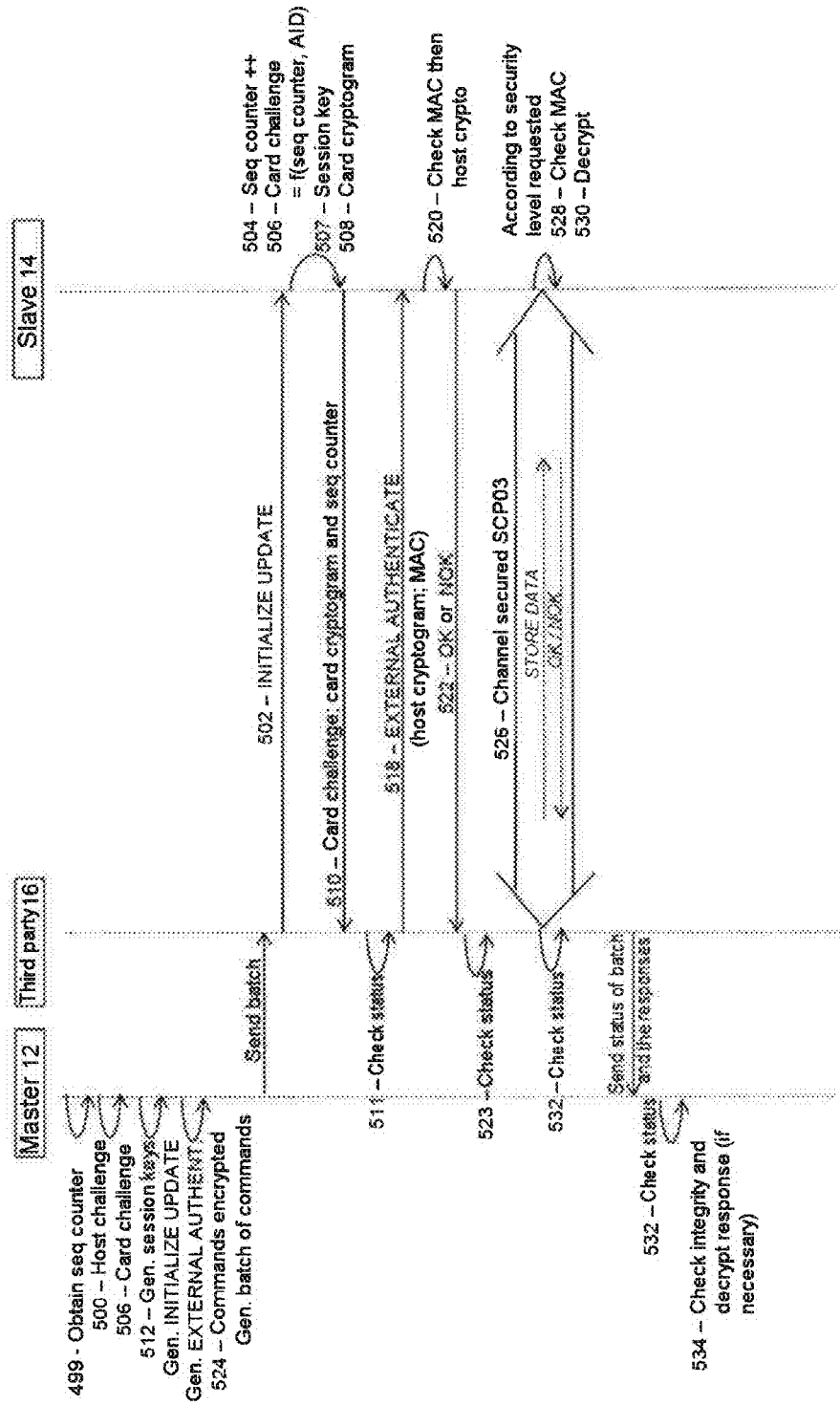
FIG. 5A schematically illustrates exchanges in a predictive mode of the SCP03 protocol.

FIG. 5A illustrates an embodiment of the predictive mode for SCP03 leading to the sending of a batch of commands to a third-party device 16.

It should be noted that, in the predictive mode, the master device 12 does not take account of the elements of the response 510. In effect, it locally holds an image of the variables and values held by the slave device 14, making it possible to locally compute the card challenge, the card cryptogram knowing the new value of the sequence counter.

In the example represented, these various processes that the master device 12 carries out predictively are performed before transmitting the batch of commands: recovery of the public value of the sequence counter shared with the target application, pseudo-random generation of the host and card challenges, generation of the session keys, generation of the INITIALIZE UPDATE and EXTERNAL AUTHENTI-CATE commands, with its MAC code, generation of other secure commands to form the batch of commands.

The third-party device 16 then has a simple intermediary role: the latter receives, from the master device 12, only the batch of commands to be played on its behalf by the slave device 14. It can check the response status received in order to determine whether the execution of the batch has to be aborted. As a variant, it may simply retransmit all of the responses to the commands that it transmits in succession.

At the end of the execution of the batch of commands, the third-party device 16 can send a general status message to the master device 12, for example in order to indicate to it the number of commands sent and whether the execution of the entire batch has been performed successfully or not. As a variant, no general status message is sent, the checking of the state (success or failure) being able to be invoked upon a subsequent command.

In these embodiments of SCP03, the STORE DATA commands are secured, that is to say provided with a chained MAC code. In a degraded variant, the SCP03 protocol may be used only for the authentication process (INITIALIZE UPDATE and EXTERNAL AUTHENTI-CATE commands) such that the STORE DATA commands generated in the step 524 are neither encrypted nor secured by a MAC code. Thus, only the EXTERNAL AUTHENTI-CATE command is secured by MAC. It further indicates, via the parameter P1 (defined in Global Platform), that the subsequent commands are not secured.

In embodiments without authentication process, the INITIALIZE UPDATE and EXTERNAL AUTHENTICATE commands are not provided, and the batch of commands begins directly with secure commands, of STORE DATA type (see FIG. 1A in which the SELECT APPLICATION command is optional because it can be performed in a decorrelated manner, before the transmission of the secured STORE DATA commands). This is made possible by virtue of the prediction of the dynamic variables enabling the master and slave devices to have the same session keys without even exchanging any message. The command securing information is for example entered in the parameter P1 of the first STORE DATA command (identifiable by the "block number" parameter equal to 0 for this command) that is thus received, making it possible to trigger the steps 504-508 on the slave device 14. For this purpose see FIG. 5B. In the configuration of this figure, the host challenge may be (pseudo-random) predictable, enabling the slave device 14 to obtain it by an internal process. As a variant, it can be obtained in a preceding operation (not illustrated) with the master device 12.

The SCP02 protocol that is also defined in GlobalPlatform is distinguished from the SCP03 protocol of FIG. 5 in that the sequence counter is not incremented on reception of the INITIALIZE UPDATE command, but on reception of the EXTERNAL AUTHENTICATE command.

The present invention falls within the framework of a predictive mode of a secure channel protocol, for example the SCP02 or SCP03 protocol. In the known techniques, a batch of pre-generated commands can be played only once, leading to numerous cost overheads, primarily for the master device 12.

In order to make it possible to replay this batch of commands, the invention provides for the use of a replay or test counter. The number of replays is preferably reasonable, notably to prevent any ill-intentioned person from infinitely testing a sequence (batch) of commands. In this case, this number is limited by a threshold value or "replay limit" as illustrated hereinbelow.

The test counter makes it possible to delay the physical incrementation of the sequence counter, that is to say its effective updating in non-volatile memory. Thus, during the use of the test counter, the current value of the sequence counter used as reference for the establishment of a secure channel remains unchanged in non-volatile memory, which makes it possible to replay the same batch of commands secured with the predicted session keys of this secure channel. It is only when this value in non-volatile memory is updated (modified), that the batch of commands becomes obsolete, requiring the master device to be requested in order to obtain an updated batch to correspond to the session keys predicted on the basis of the new current value of the sequence counter.

As defined above, a slave device 14 according to the invention increments a test counter on reception of a command, called first command (notably an INITIALIZE UPDATE initialization command in SCP02 or SCP03), indicating the establishment of a secure communication channel; and overwrites the current value of the dynamic variable in non-volatile memory with the computed update value when the test counter reaches a threshold value, that is to say that it stores a computed update value, in non-volatile memory, as new current value of the dynamic variable (for example, the sequence counter used to secure the communication channel) when the test counter reaches a threshold value.

By virtue of the use of this test counter which delays the validation (commitment) of the update value as new current value of the dynamic variable in non-volatile memory, the same commands (secured by the current value of the dynamic variable) can be replayed. Thus, the third-party device 16 can replay the batch of commands as long as the slave device has not updated the current value of the dynamic variable in non-volatile memory, that is to say as long as it does not receive, from the slave device 14, an indication indicating an update of the current value of the dynamic variable (the sequence counter) by the slave device. As will be seen hereinbelow it is for example advisory for the third-party device 16 to be capable of analyzing the response statuses of the slave device 14 in order to detect therein certain statuses corresponding to situations where the slave device has physically updated the current value of the sequence counter because a replay of the batch of commands is not appropriate.

Figure 6:
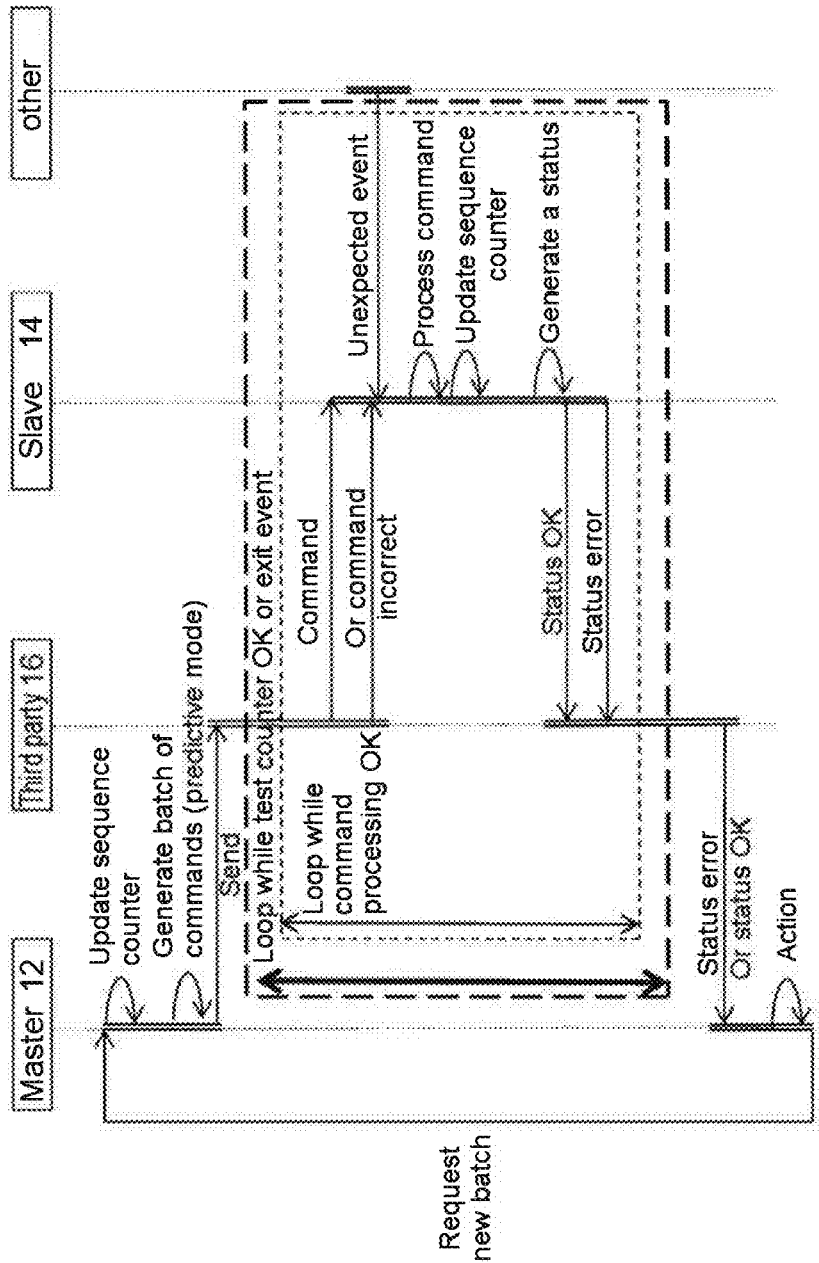
FIG. 6 illustrates, by the same scheme as FIG. 3, the possibility of replaying a batch of commands according to embodiments of the invention.

FIG. 6 illustrates, on the same scheme as FIG. 3, the possibility of replaying a batch of commands by the third-party device 16, represented in this figure by a loop (bold arrow) as long as the limit on the number of tries counted by the slave device 14 is not reached (in which case an indication is transmitted to the third-party device 16) or an exit event (indicating that a replaying of the batch of commands is useless) occurs.

In this configuration, the occurrence of an unexpected event (timer out, reset, disturbance of the communication channel, etc.) does not lead directly to the master device 12 being invoked to generate a new batch of commands. Here, the batch of commands for which the unexpected event has occurred can be replayed if it is not a so-called "exit" event. If this event happens once only, the new replaying of the batch of commands should lead to it being played in its entirety. It can thus be seen that invoking the master device is avoided when uncontrolled events occur.

In the approach proposed here, the third-party device 16 therefore has the capacity to replay, up to a certain limit, a batch of commands when it receives, from the slave device 14, a notification of error on the commands played, that is to say a replay loop exit event.

When said limit on the number of replays is reached, the slave device 14 indicates this (explicitly or implicitly) such that the third-party device 16 does not replay the current batch of commands, but invokes the master device 12 to generate a new updated batch of commands (if the current batch has not been able to be executed normally). The commands of the new batch can be similar to those of the current batch; the difference being that the encryption and the computation of the MAC codes for the secure commands are now based on a new value of the sequence counter, in SCP02 or SCP03.

Obviously, when the execution of the entire batch of commands has been run successfully, provision is made for the replaying not to be possible, in order to avoid any analysis by an ill-intentioned person. A status indicating the successful execution of the batch of commands thus constitutes a replay loop exit event. Other exit events are envisaged below to avoid a replay when this is pointless. Such is, for example, the case when secured, integral and authentic command (that is to say one with a valid MAC code) leads to an execution error or exception.

In these cases, the slave device 14 simply has to update the sequence counter (the dynamic variable) in non-volatile memory, rendering the current batch of commands obsolete. The third-party device 16 is notified of this situation by virtue of the response statuses that it receives from the slave device 14.

Figure 7:
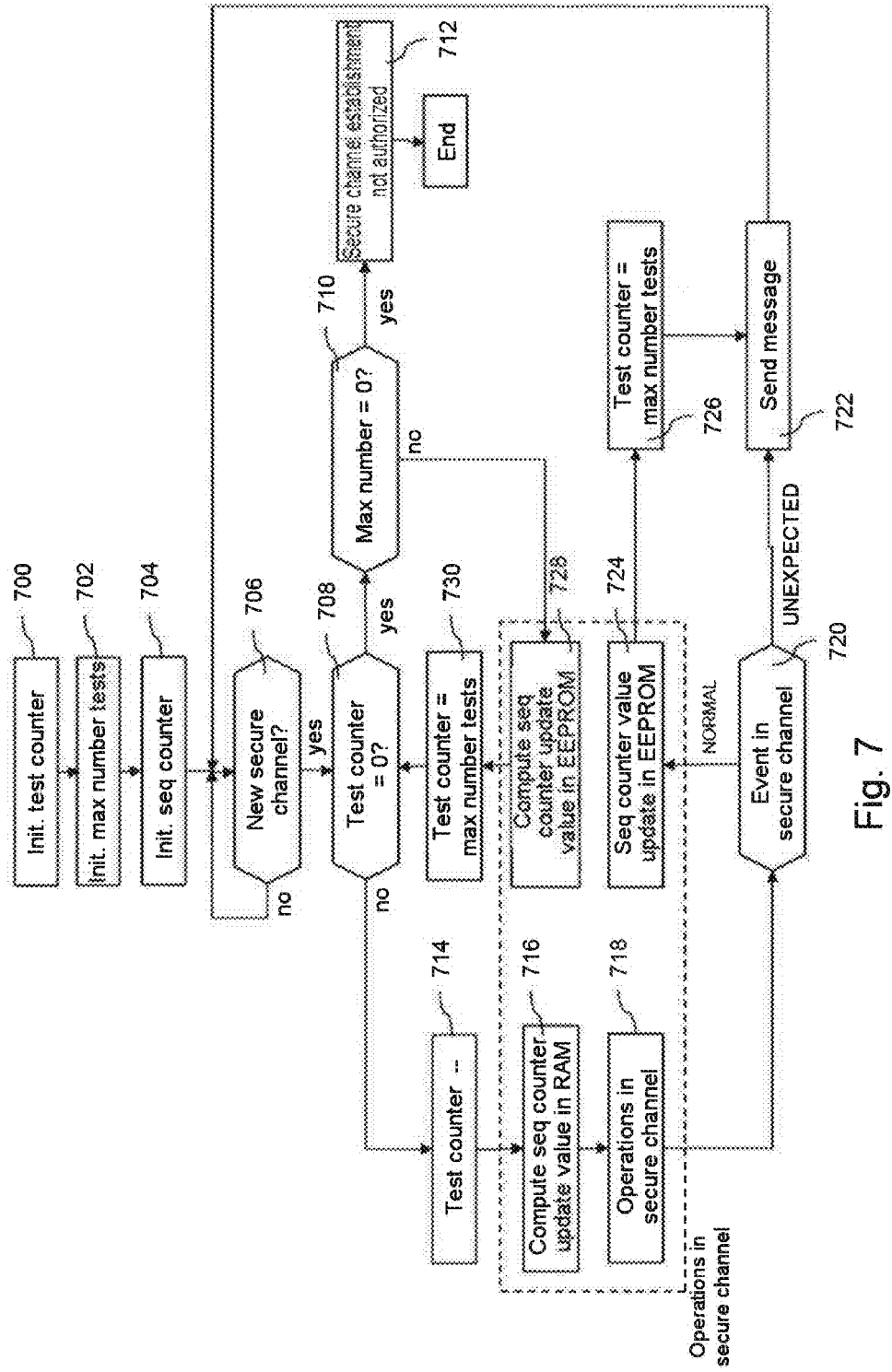
FIG. 7 illustrates, in flow diagram form, general steps of an embodiment of the invention on the part of the slave device.

FIG. 7 illustrates, in flow diagram form, general steps of an embodiment of the invention on the slave device side 14.

The method of the figure begins with an initialization phase (steps 700 to 704) which can take place when customizing the slave device, typically a chip card or a secure element. During this phase, a test counter is created in non-volatile memory, and initialized with a default value, for example 10, in the step 700. Then, in the step 702, a limit threshold value on the number of tests or tries (and therefore of replays) is defined and stored in non-volatile memory, for example 10. In this embodiment where the test counter is initialized with the maximum number of tries allowed, this test counter will be decremented to finally reach the value 0, which can be easily detected because, at that moment, the transfer of the counter from 0 to −1 requires all the bits to be modified (for example, for a 32-bit counter: 00000000→FFFFFFFF if on four bytes). Obviously, other embodiments can initialize the counter at 0 and increment it to a limit threshold value equal to 10.

In the step 704, the dynamic variable or variables, typically the sequence counter, are initialized. For example, the sequence counter is initialized at 0.

During this step 704, it may be that the dynamic variable and any other parameters (for example a secret) are shared between the slave device 14 and the master device 12 to make it possible to implement the predictive mode of the secure channel protocols.

Following its customization, the slave device 14 is placed in service awaiting the establishment of a new secure channel. This involves, for example, the reception of an INITIALIZE UPDATE command in the case of SCP02 or SCP03 illustrated in FIG. 5A. It involves the reception of the first command (for example STORE DATA) secured in the example of FIG. 5B. This is the step 706.

When such a command is received, the steps 708 and 710 consist in checking that the test counter and the maximum number of tests are not both at 0, in which case no secure channel can be established (step 712) and the method is terminated.

In the general case, the maximum number of tests is not zero. Thus, as long as the test counter (in a mode where it is decremented) is not zero ("no" output from the test 708), the test counter is decremented in the step 714, followed by step 716 consisting in updating the dynamic variables necessary to the secure channel, that is to say in computing an update value of the dynamic variable or variables (notably the sequence counter) from a current value of the dynamic variable or variables stored in non-volatile memory. The update value or values of these dynamic variables are then stored in volatile memory, ensuring that their current values remain unchanged, and therefore suited to a replaying of the same batch of commands.

The slave device 14 then processes the command received in a conventional manner, as well as the subsequent secure commands as received from the third-party device 16. These operations on the secure channel are represented schematically by the step 718, and are described above with reference to FIGS. 5 to 5B.

The execution of the secure commands of the current batch leads to two main situations, and one situation dealt with in particular here.

As represented in the figure, in the step 720, a determination is made as to whether the execution of the batch of secure commands has run well ("normal" output from the test 720) or whether an unpredicted event has occurred ("unexpected" output from the test 720).

Such an event can correspond to an error of transmission of a secure command of the batch (error that can be detected through the MAC code accompanying the command). In this case, the secure channel is closed by the sending of an error message to the third-party device 16 (step 722) before the slave device 14 resumes awaiting a new command for a new secure channel.

The "normal" execution of the batch of secure commands occurs when the slave device 14 has received all the secure commands, with valid MAC authentication codes. The last command may notably comprise an end-of-secured-commands indication (a binary flag can be provided for this purpose in the command; the field P1 can indicate that the subsequent commands are no longer secured), making it possible for the slave device 14 to detect the end of the secure commands. Any other means for the slave device 14 to identify the last secure command can be provided.

The normal execution of all of the secure commands constitutes a replay loop exit event, leading to the closure of the secure channel. In this case, the slave device 14 stores the computed update value (which is in volatile memory at that moment, because of the step 716), in non-volatile memory as new current value of the dynamic variable, typically the sequence counter. The old current value is therefore overwritten by the computed update value. This is the step 724.

Generally, all of the commands of the batch (after the EXTERNAL AUTHENTICATE) are secured. Thus, the successful execution of all of the secure commands corresponds to the successful execution of the batch of commands.

Another example corresponds to the case where the level of security defined in the parameter P1 of the EXTERNAL AUTHENTICATE command indicates "no secure messaging expected", that is to say a "0" value (see section 7.1.2 of GlobalPlatform). In this case, only the EXTERNAL AUTHENTICATE command is secured (the subsequent ones are not). The invention therefore makes it possible to replay the batch of commands only when an unexpected event occurs for this EXTERNAL AUTHENTICATE command, being in fact limited to the replay of the only protected command, namely EXTERNAL AUTHENTICATE.

Following the commitment of the new current value of the sequence counter (step 724), the test counter is reset to the default value, "10" in the preceding example, in a step 726.

Then, in the step 722, the slave device 14 sends, to the third-party device 16 and in response to the last secure command of the secure commands of the batch, a message comprising an indication that the execution of all the secure commands of the batch has been carried out successfully. This is for example an acknowledgement message in response to this last command of the current batch. As indicated above, the last secure command can be identified as such using an indicator, or else stem from the occurrence of the secure command relative to a planned number of secure commands.

The third situation corresponds to a secure command of the batch, whose message authentication code is checked successfully (therefore the secure command is integral and authentic) and which leads to an execution error or exception of this command. In other words, the execution of the command, once decrypted, fails. In other words, this command as defined and encrypted by the master device 12 is incorrect, corrupting the current batch of commands which is therefore also incorrect. Such is, for example, the case when the command indicates a function that not exists on the slave device. Alternatively, it may be a malformed command, with incorrect parameters. In this case it is not advisable to proceed with replays of this batch. To avoid these replays, the slave device 14 can force the third-party device 16 to once again invoke the master device 12, by updating, in non-volatile memory, the current value of the sequence counter with the update value currently stored in volatile memory and/or by returning an error status that the third-party device 16 can interpret as replay loop exit event.

Such a situation can also be detected in the step 720, leading to the step 724 for the effective updating of the sequence counter in non-volatile memory, then to the resetting of the test counter in the step 726 and finally to the step 722 in which a message is sent, to the third-party device in response to this command leading to an execution error or exception, the message comprising an indication of the execution error or exception despite a successfully checked message authentication code.

In order to avoid a possibility of desynchronization of the sequence counter with the test counter (the test counter is reset when the sequence counter in non-volatile memory is incremented), it is appropriate for the step consisting in overwriting the current value in non-volatile memory and the step consisting in resetting the test counter to be carried out in an atomic step, that is to say an indivisible step, to prevent any malicious person from diverting the method at that moment.

Other exit events leading to the effective updating (commitment) of the sequence counter in non-volatile memory can be envisaged.

Another example of exit event is the case of a MAC code of the EXTERNAL AUTHENTICATE command which is detected as valid although the host cryptogram that it contains is detected as incorrect.

To return to the steps 708 and 710, if the test counter indicates the value "0", that is to say that the test counter reaches a threshold value and the maximum number of replays is reached, the slave device 14 computes the update value of the sequence counter from its current value stored in non-volatile memory; then stores this computed update value in non-volatile memory as new current value of the sequence counter (which is therefore overwritten). This is the step 728.

The method then continues to the step 730, similar to the step 726, to reset the test counter; then once again tests the value of the test counter in the step 708. This loop ensures the commitment of the new current value of the sequence counter when the maximum number of replays is reached.

In order to avoid a possible desynchronization of the sequence counter with the test counter, the step consisting in overwriting the current value in non-volatile memory and the step consisting in resetting the test counter are carried out before the step of generation of the session key from the computed update value. This arrangement is applied when the fact that the maximum number of replays has been reached is detected with a new first command indicating the establishment of a secure channel, for example an INITIALIZE UPDATE command ("yes" in the test 708). Generally, these steps are carried out in an atomic step, that is to say an indivisible step, to prevent any malicious person from diverting the method at that moment.

The looping on the step 708 makes it possible to process the current batch (all the secure commands of the batch) if the latter is already online with the new current sequence counter value. This is because, depending on the level of information that the slave device 14 returns to the third-party device 16, it is possible for the latter to anticipate arriving at the limit number of tries, so that the obtaining of an updated batch of commands can be anticipated. Whatever the case, if the current batch is not yet updated (and therefore obsolete), it will be on the next iteration because the third-party device 16 will be informed of the new current sequence counter value upon the reception of the message 510 (see FIG. 5A) during the next step 718.

Figure 5B:
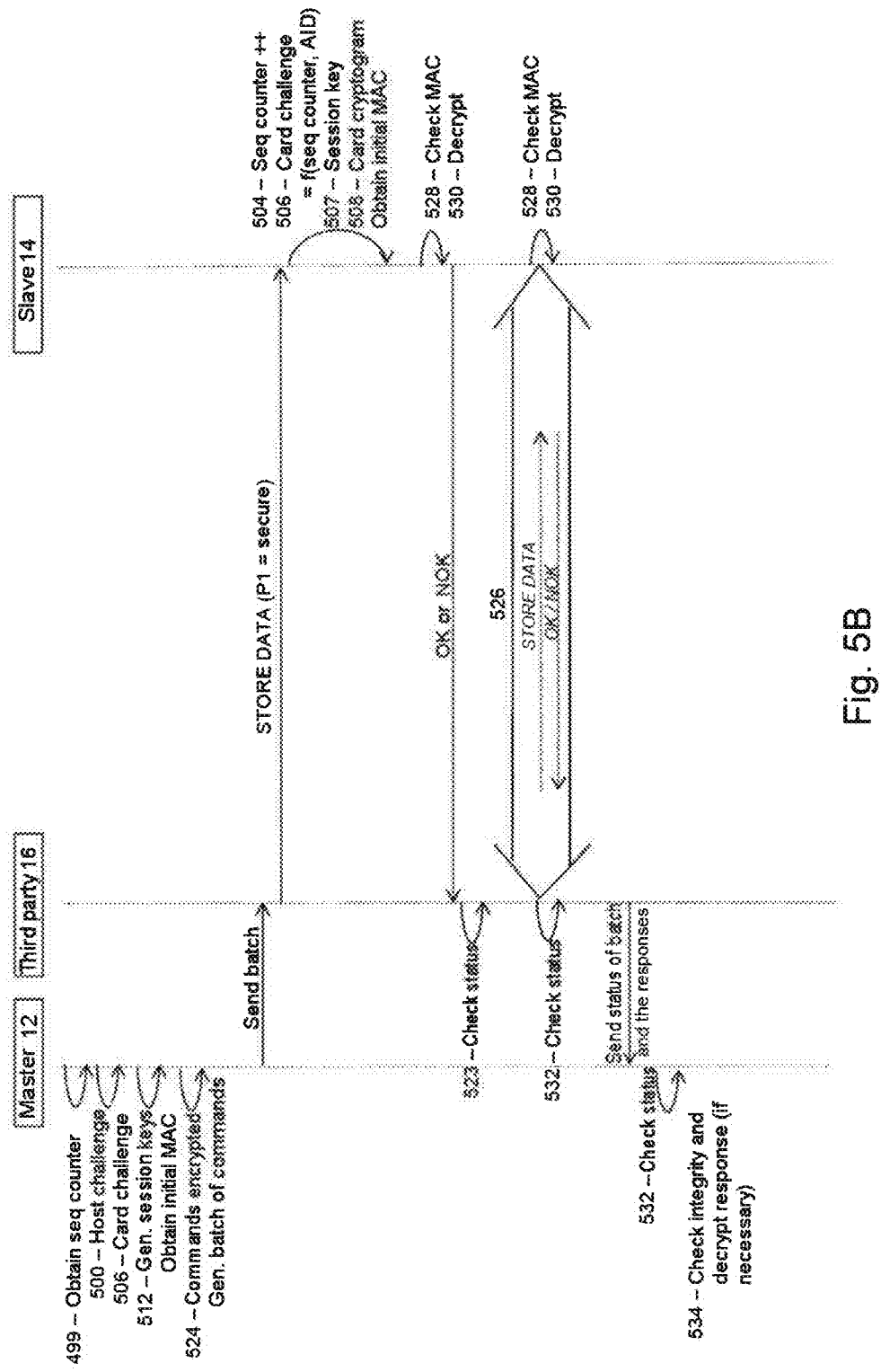
FIG. 5B schematically illustrates exchanges in a predictive mode of a batch of commands without authentication procedure.

It should be noted that, in the implementation of FIG. 5B, this exchange 510 does not take place. Since the sequence counter is public, a synchronization mechanism may, upon the initiative of the third-party device or of the slave device, provide for the current value of the sequence counter to be communicated to the third-party device. For example, the current value can be returned automatically in response to each first command of a batch, or be invoked by a GET DATA command from the third-party device.

In the example of FIG. 7, the value of the test counter is compared with the maximum number of possible replays before decrementing (or incrementing) said test counter. A variant may consist in reversing the order of these two steps.

Figure 8:
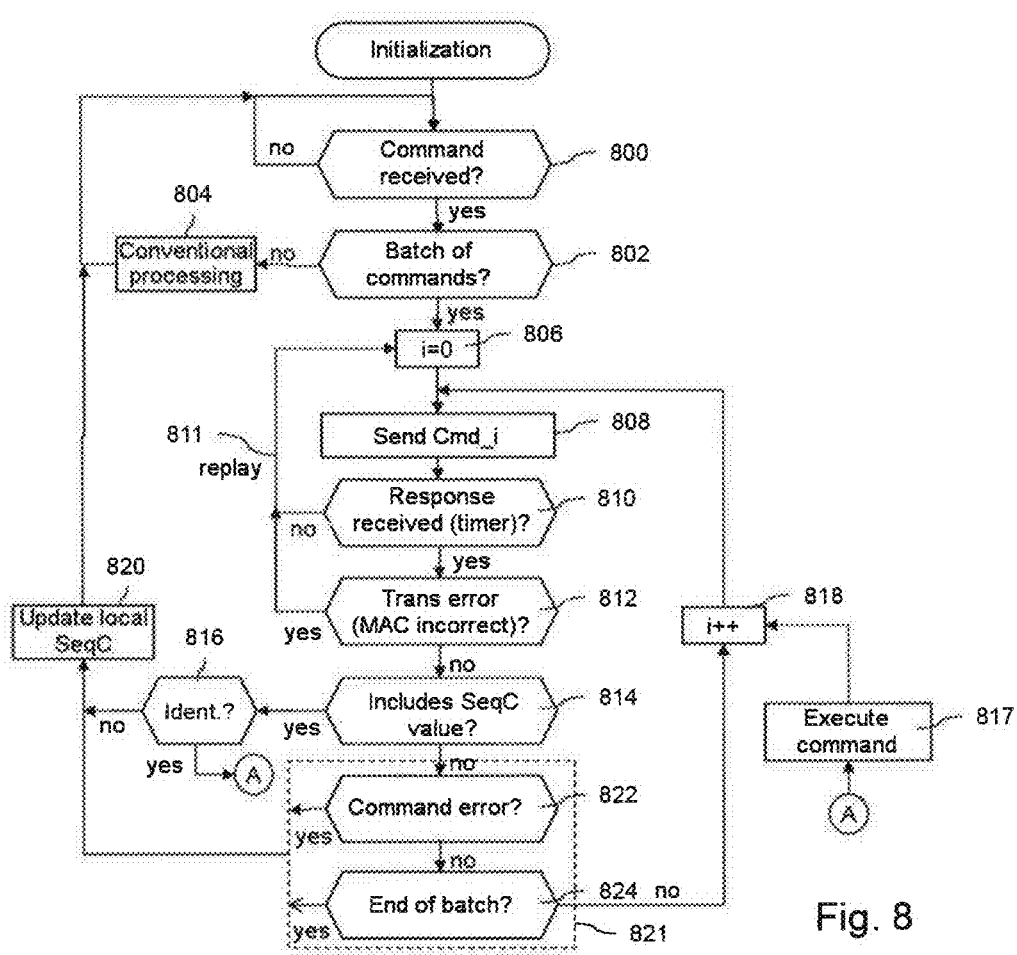
FIG. 8 illustrates, in flow diagram form, general steps of an embodiment of the invention on the part of the third-party device.

FIG. 8 illustrates, in flow diagram form, general steps of an embodiment of the invention on the third-party device side 16.

After an initialization, the third-party device 16 awaits the reception of one or more commands from the master device 12. This is the step 800.

On reception a determination is made, in the step 802, as to whether it is a batch (script or batch) of commands pre-generated in predictive mode. If it is not, the commands are processed conventionally in the step 804, before returning to await a new command (step 800).

Otherwise, an index "i" is initialized at 0 in the step 806, said index making it possible to select and sequentially process each of the commands of the batch received.

In the step 808, the third-party device 16 sends the command "i" to the slave device 14.

If no response is received (test 810), the third-party device 16 considers that an unpredicted event has occurred, and proceeds to replay (arrow 811) the current batch of commands by returning to the step 806.

If a response is received, the third-party device 16 determines, in the step 812, whether an unpredicted event has occurred, for example because the response indicates that the MAC code of the command is incorrect (a transmission error has occurred). If such is the case, the third-party device 16 proceeds to replay (811) the current batch of commands by returning to the step 806.

If the command has been received correctly by the slave device 14, the third-party device 16 determines, in the step 814, whether the response contains a value of the sequence counter of the slave device 14. Such information is present in the response to the first INITIALIZE UPDATE command as described previously in conjunction with FIG. 5.

If the value of the sequence counter of the slave device 14 is indicated in the response, it is compared, in the step 816, to a local value that is stored by the third-party device 16.

If the two values match, this means that the slave device 14 has not updated (in non-volatile memory) its sequence counter since the last iteration, that is to say that the method is in the course of replaying a same batch of commands. In this case, the command is executed if necessary (step 817) then the next command of the set is selected by incrementing the index "i" in the step 818, which loops back to the step 808.

If, on the other hand, the two values are different, this means that the slave device 14 has updated (in non-volatile memory) its sequence counter since the last iteration (either by reaching the maximum number of replays, or because the last batch of commands has been entirely processed, or finally because the last batch of commands was intrinsically incorrect). In this case, said local value is updated, in the step 820, to take the sequence counter value received. Still in the step 820, the third-party device 16 contacts the master device 12 to possibly request from it a batch of commands updated with the new current value of the sequence counter.

Back to the test 814, if the response received does not contain the sequence counter value (for example if it is not the response to the first INITIALIZE UPDATE command in the case of FIG. 5A), the third-party device 16 determines, in the step 821, whether the response received indicates a replay loop exit event.

In the example of the figure, two tests are proposed. Obviously, additional tests to detect other exit events can be implemented.

In the step 822, the third-party device 16 determines whether the response received indicates an intrinsic command error (the response status takes a predefined code), in which case the local sequence counter value is updated, in the step 820, in a manner similar to an update by the slave device 14 (generally by simple increment). This is because this operation makes it possible to reflect the effective updating 724 of the sequence counter operated by the slave device 14. A synchronization of the sequence counter between the third-party device 16 and the slave device 14 is thus guaranteed.

Similarly, if the response received indicates that all of the secure commands have been entirely processed successfully (test 824—for example status OK in response to the last secure command), the local sequence counter value is also updated, in the step 820, in a manner similar to an update by the slave device 14, to reflect the changes in the latter device.

Otherwise, no unexpected or exit event has occurred, leading to the processing of the other steps being continued via the step 818.

Figure 9:
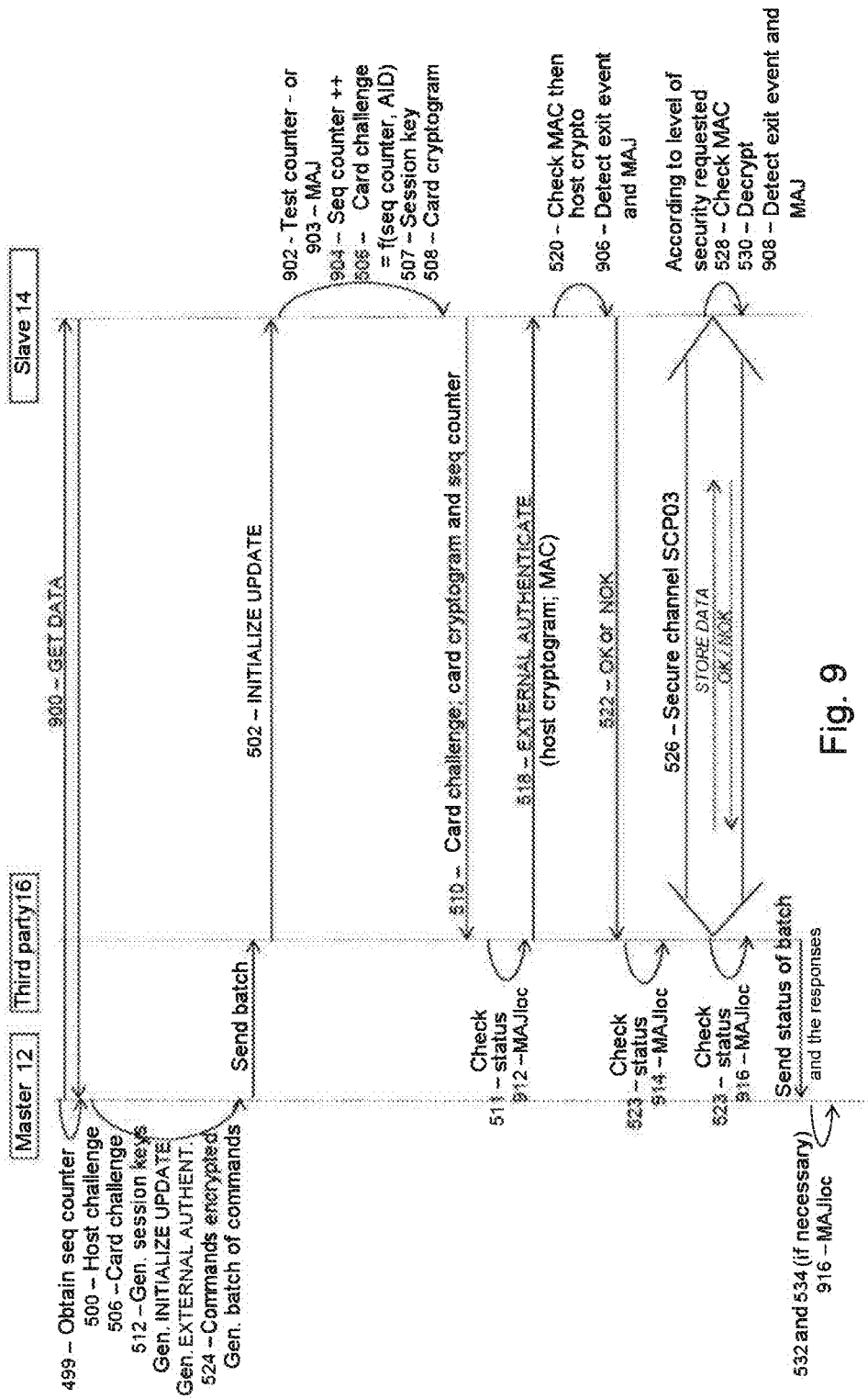
FIG. 9 illustrates, by using the scheme of FIG. 5A, exchanges of an embodiment of the invention relying on the predictive mode of the SCP03 protocol.

FIG. 9 illustrates, using the scheme of FIG. 5A, exchanges of an embodiment of the invention relying on the SCP03 protocol. The steps 5xx remain unchanged relative to FIG. 5A, showing that the present invention is compatible with the existing secure channel protocols.

It should be noted that the explanations below apply also to the predictive mode with the sequencing of FIG. 5, or to the predictive mode without authentication of FIG. 5B. Furthermore, they apply to other protocols in which one or more secure commands are transmitted in a secure channel.

In order to be properly synchronized with the slave device 14, the master device 12 is capable of recovering the current sequence counter value (step 499), from the slave device 14, via the third-party device 16. For example, this current value can be requested using a GET DATA command (with a flag 9F70), illustrated by the exchanges 900 in the figure.

The test counter is decremented (step 714) immediately after the reception of the first command indicating the establishment of a secure channel, here the INITIALIZE UPDATE command, as shown by the step 902.

When this test counter reaches the maximum number of possible replays, the sequence counter is updated in non-volatile memory (step 728) and the test counter is reset (step 730). These two steps, corresponding to the step 903, are illustrated by the letters "MAJ" in the figure.

The step 904 is distinguished from the step 504 in that the update value of the sequence counter is stored in volatile memory (and not in non-volatile memory as in the step 504), in order to allow for a possible replay of the current batch of commands.

The following steps 506-511, 518, 520 are identical to those of FIG. 5A, the slave device 14 then having checked the MAC and the cryptogram contained in the EXTERNAL AUTHENTICATE command, that is to say the very first command secured by a MAC code.

In the step 906 terminating the processing of the EXTERNAL AUTHENTICATE command, the slave device 14 determines whether a replay loop exit event has occurred. In particular these events are predefined.

In the case of a replay loop exit event, the slave device 14 updates the sequence counter in non-volatile memory (step 724), and resets the test counter (step 730) ["MAJ" in the step 906].

A replay loop exit event is, for example, a negative check of the host cryptogram of the EXTERNAL AUTHENTICATE command.

Optionally (in particular if the EXTERNAL AUTHENTICATE command indicates that subsequent commands are secured), a replay loop exit event may be the detection of an incorrect MAC of the EXTERNAL AUTHENTICATE command. However, generally, an incorrect MAC (which leads to the closure of the secure channel), and therefore including that of the EXTERNAL AUTHENTICATE command, will be considered as representative of an unexpected event, which allows for a replay of the batch of commands.

The negative response 522 (NOK) may then comprise (in the optional parameter SW) an error code which is different if it is an exit event leading to the updating of the current value of the sequence counter or an unexpected event allowing for the replay. These error codes are known to the third-party device 16.

Then, each of the subsequent secure commands of the batch of commands is processed (526), a processing that involves, for the slave device 14, checking the MAC code (528), decrypting and executing the command (530) and determining whether a replay loop exit event has occurred, in which case an updating of the current value of the sequence counter in non-volatile memory and a resetting of the test counter are performed ["MAJ" in the step 908].

An incorrect MAC code leads to the closure of the communication channel. It is considered as an unexpected event allowing for the replay, because this MAC code error may simply result from a transmission error, and not from an error in the batch of commands to be transmitted.

A replay loop exit event is, for example, an error of execution of a secure command having a valid MAC code. In this case in fact, the secure command is intrinsically incorrect, a replay not making it possible to resolve the source of the error (for example an incorrect or missing parameter in the command). The negative response returned (NOK) may then comprise (in the optional parameter SW) an error code which is different if it is an exit event leading to the updating of the current value of the sequence counter or an unexpected event allowing for the replay. These error codes are known to the third-party device 16.

Another replay loop exit event is simply the correct execution of the last secure command of the current batch. Such a "last command" may be directly indicated using an appropriate flag, or be implicit, for example when an initial command indicates the number of secure commands to come. Correspondingly, the third-party device 16 receives the response statuses of the slave device 14, enabling it to determine whether an unexpected event or a replay loop exit event has occurred on the slave device 14.

The detection of an exit event leads to the updating, by the third-party device 16, of its local sequence counter ("MAJloc" in the figure).

In particular, by virtue of the responses returned by the slave device 14, the third-party device 16 detects when it receives a sequence counter value that is different from the locally stored value (see 912), a host cryptogram error code (see 914), a message indicating an error of execution of a command with valid MAC code (see 916) or a success message for the last secure command of the batch (see 916 also).

Figure 9A:
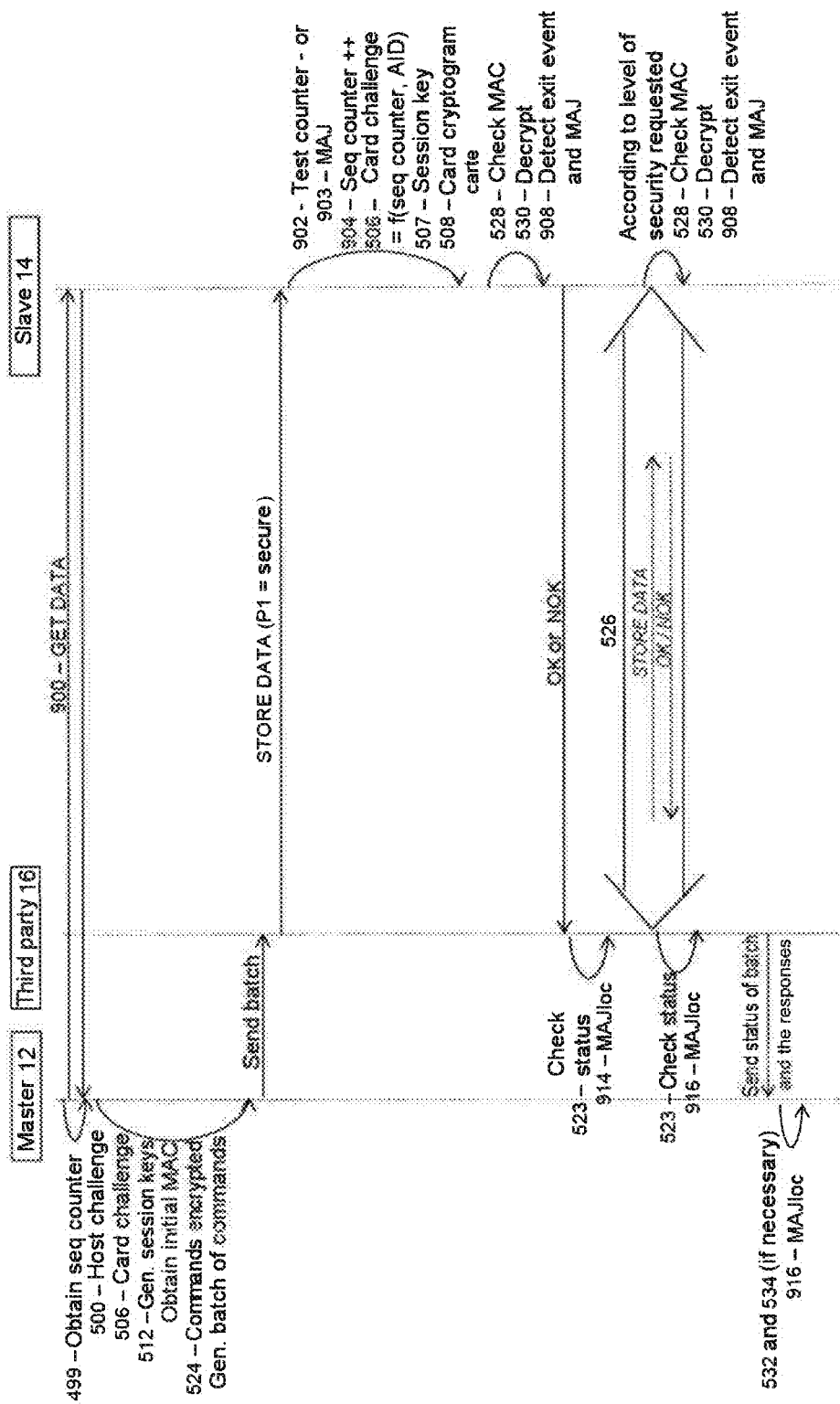
FIG. 9A illustrates, by using the scheme of FIG. 5B, exchanges of an embodiment of the invention of a batch of predicted commands without authentication procedure.

FIG. 9A illustrates the same explanations in the absence of authentication procedure (FIG. 5B), that is to say when the first command indicating the establishment of a secure channel is itself a secure command (FIG. 1B).

Figure 10:
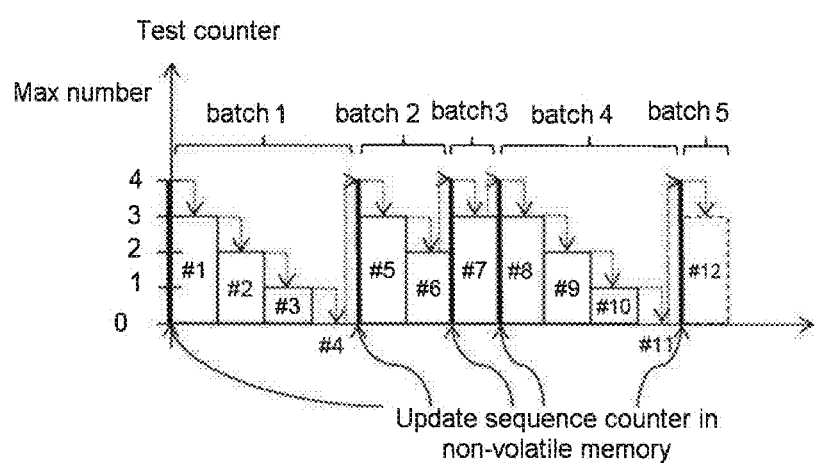
FIG. 10 illustrates the effect of delaying the effective updating in non-volatile memory of the sequence counter in one implementation of the invention.

FIG. 10 illustrates the effect of delaying the effective updating in non-volatile memory of the sequence counter. The example of the figure is based on a maximum number of replays equal to 4, and illustrates the execution of five batches of secure commands.

The test counter, initially at 4, is decremented to 3 upon the first play for the first batch of commands, during which an update value of the sequence counter is stored in volatile memory. This first play (#1) is a failure (whatever the reason), leading to the replaying of the current batch.

The test counter is then decremented to 2, but this second play (#2) of the batch is also a failure (the same update value of the sequence counter is stored in volatile memory). The test counter is then decremented to 1, but this third play (#3) of the batch is again a failure. The test counter is then decremented to 0, but this fourth play (#4) of the batch is also a failure.

On detecting the test counter at 0, the sequence counter is updated in non-volatile memory, rendering the current batch of commands obsolete. The third-party device 16 obtains a new batch of commands (possibly the same commands, encrypted differently). The test counter is also reset to 4.

The test counter is then decremented to 3, but the first play (#5) of the new batch is a failure (a new update value of the sequence counter is stored in volatile memory). The test counter is then decremented to 2. The second play (#6) of the new batch is, here, a success, leading to the updating of the sequence counter in non-volatile memory. The third-party device 16 obtains a third and new batch of commands. The test counter is reset to 4.

The test counter is then decremented to 3. The first play (#7) of the new batch is, here, a success, leading to the updating of the sequence counter in non-volatile memory. The third-party device 16 obtains a fourth and new batch of commands. The test counter is reset to 4.

The test counter is then decremented to 3, but the first play (#8) of the new batch is a failure. The test counter is then decremented to 2, but the second play (#9) of the new batch is a failure. The test counter is then decremented to 1, but the third play (#10) of the new batch is a failure. The test counter is then decremented to 0, but the fourth and last play (#11) of the new batch is also a failure.

On detecting the test counter at 0, the sequence counter is updated in non-volatile memory, rendering the new current batch of commands obsolete. The third-party device 16 obtains a new batch of commands (possibly the same commands, encrypted differently). The test counter is reset to 4.

The method continues in the same way, with the decrementation of the test counter to 3 and with the first play (#12) of the new batch.

The above examples are only embodiments of the invention which is not limited thereto.

In particular, the above examples show a complete replay of a batch of commands, that is to say that the first command of the replay is the first command indicating the establishment of the secure channel, i.e. INITIALIZE UPDATE in certain SCP02 or SCP03 modes. Now, the invention applies also when the first command is a secure command indicating the establishment of a secure channel (see FIG. 9A). Thus, as a variant, provision may be made to perform replays from a restore point provided in the command script, that is to say from a predefined secure command (a number of secure commands forming restore points may be provided in the batch).

For example, certain secure commands may be indicated, by the master device, as "restore point" commands, for example every ten commands. This indication may be provided in binary flag form in the unencrypted header of the commands, in order for the third-party device 16 to be able to interpret it.

This indication is processed in a similar manner by the third-party device 16 and the slave device 14, namely by the storage of a current context when this "marked" command is executed (the third-party device receives an acknowledgement). In particular, the current context contains the number "i" of the "restore point" command, the session keys, a copy of the last command and of the last response (including their MAC codes and one or more CBC counters) in order to allow for a decryption/encryption of the subsequent commands/responses.

Thus, when an unexpected event occurs (power supply outage, incorrect MAC code), the devices play the batch of commands again from the last "restore point" command stored in the context backed up.

It should be noted that if the slave device is not aware of this unexpected event (for example non-reception of a command), the next command that it receives from the third-party device is the "restore point" command, therefore leading to an incorrect check of the MAC code of this command. The two devices then start out again on a new replay of the batch from this "restore point" command, ensuring an effective resynchronization.

The invention claimed is:

1. Communication method comprising, on a slave device, the following steps:
    receiving, from a third-party device, a command, called first command, indicating the establishment of a communication channel secured by at least one session key;
    computing an update value of a dynamic variable from a current value of the dynamic variable stored in non-volatile memory;
    generating the session key from the computed update value;
    receiving, from the third-party device, at least one command, called second command, secured by a message authentication code; and
    checking the message authentication code using the session key before executing said second command;
    characterized in that it further comprises, on the slave device, the following steps:
    incrementing a test counter on reception of the first command indicating the establishment of a secure communication channel; and
    overwriting the current value of the dynamic variable in non-volatile memory with the computed update value when the test counter reaches a threshold value.

2. Method according to claim 1, in which the step of computation of an update value comprises the storage of the computed update value in a volatile memory of the slave device.

3. Method according to claim 1, in which the current value of the dynamic variable in non-volatile memory is overwritten in non-volatile memory with the computed update value when the last secure command of all of the second secure commands comprises a validly checked message authentication code and is executed successfully.

4. Method according to claim 3, further comprising the following step: transmitting, to the third-party device and in response to said last secure command, a message comprising an indication that the execution of said second command has been carried out successfully.

5. Method according to claim 1, in which the current value of the dynamic variable in non-volatile memory is overwritten in non-volatile memory with the computed update value when one said second command whose message authentication code has been checked successfully leads to an error or exception in execution of this second command.

6. Method according to claim 5, further comprising the following step: transmitting, to the third-party device and in response to said second command leading to an execution error or exception, a message comprising an indication of the execution error or exception despite a successfully checked message authentication code.

7. Method according to claim 1, in which the test counter is reset to a default value when the current value of the dynamic variable in non-volatile memory is overwritten with the computed update value.

8. Method according to claim 7, in which the step consisting in overwriting the current value in non-volatile memory with the computed update value and the step consisting in resetting the test counter are performed before the step of generation of the session key from the computed update value.

9. Method according to claim 7, in which the step consisting in overwriting the current value in non-volatile memory with the computed update value and the step consisting in resetting the test counter are performed in an atomic step.

10. Method according to claim 1, in which said first command is one said second command secured by a message authentication code.

11. Method according to claim 1, in which the message authentication codes of a number of second commands are chained.

12. Communication method comprising, on a third-party device, the following steps:
    receiving, from a master device, a batch of commands to be sent to a slave device, the batch of commands including a command, called first command, indicating the establishment, with the slave device, of a communication channel secured by at least one session key dependent on a current value of a dynamic variable shared between the master device and the slave device, and at least one command, called second command, secured by a message authentication code computed using the session key;
    playing the batch of commands so as to send, to the slave device, the commands of the batch sequentially, command by command, as long as no error is detected;
    characterized in that it further comprises, on the third-party device, the following step:
    replaying the batch of commands as long as the third-party device does not receive, from the slave device, an indication of an update of the current value of the dynamic variable by the slave device.

13. Method according to claim 12, in which receiving the indication of update of the dynamic variable by the slave device comprises receiving, from the slave device, a current value of the dynamic variable and comparing the received current value with a local value of the dynamic variable.

14. Method according to claim 13, in which the current value of the dynamic variable is received, by the third-party device, in a response from the slave device to the first command.

15. Method according to claim 12, in which receiving the indication of an update of the dynamic variable by the slave device comprises receiving, from the slave device, an error message in response to one said second command immediately subsequent to the first command, the error message indicating an incorrect message authentication code for said second command immediately subsequent to the first command.

16. Method according to claim 12, in which the indication of an update of the current value comprises an indication that the execution of said second command or commands of the batch by the slave device has been carried out successfully.

17. Method according to claim 12, in which the indication of an update of the current value comprises an indication that the execution, by the slave device, of a second command of the batch whose message authentication code has been checked successfully has led to an error of this second command.

18. Processing device comprising a non-volatile memory storing a current value of a dynamic variable, and a processor configured to:
receive, from a third-party device, at least one command, called first command, indicating the establishment of a communication channel secured by at least one session key;
compute an update value of the dynamic variable from the current value stored in non-volatile memory;
generate the session key from the computed update value;
receive, from the third-party device, at least one command, called second command, secured by a message authentication code; and
check the message authentication code using the session key before executing said second command;
characterized in that the processing device further comprises a test counter, and the processor is further configured to:
increment the test counter on reception of the first command indicating the establishment of a secure communication channel; and
overwrite the current value of the dynamic variable in non-volatile memory with the computed update value when the test counter reaches a threshold value.

19. System comprising a slave device according to claim 18, a third-party device comprising a processor configured to:
receive, from a master device, a batch of commands to be sent to a slave device, the batch of commands including a command, called first command, indicating the establishment, with the slave device, of a communication channel secured by at least one session key dependent on a current value of a dynamic variable shared between the master device and the slave device, and at least one command, called second command, secured by a message authentication code computed using the session key;
play the batch of commands so as to send, to the slave device, said commands of the batch sequentially, command by command, as long as no error is detected;
replay the batch of commands as long as the processing device does not receive, from the slave device, an indication of an update of the current value of the dynamic variable by the slave device, and a master device configured to generate and send the batch of commands to the third-party device.

20. A computer processing device comprising:
a microprocessor configured to:
receive, from a master device, a batch of commands to be sent to a slave device, the batch of commands including a command, called first command, indicating the establishment, with the slave device, of a communication channel secured by at least one session key dependent on a current value of a dynamic variable shared between the master device and the slave device, and at least one command, called second command, secured by a message authentication code computed using the session key;
play the batch of commands so as to send, to the slave device, said commands of the batch sequentially, command by command, as long as no error is detected;
wherein the microprocessor is further configured to:
replay the batch of commands as long as the processing device does not receive, from the slave device, an indication of an update of the current value of the dynamic variable by the slave device.

21. Computer program device comprising instructions, when executed on a processing device of a computer, cause the processing device to implement each of the steps of the method comprising:
receiving, from a third-party device, a command, called first command, indicating the establishment of a communication channel secured by at least one session key;
computing an update value of a dynamic variable from a current value of the dynamic variable stored in non-volatile memory;
generating the session key from the computed update value;
receiving, from the third-party device, at least one command, called second command, secured by a message authentication code; and
checking the message authentication code using the session key before executing said second command;
characterized in that it further comprises, on the slave device, the following steps:
incrementing a test counter on reception of the first command indicating the establishment of a secure communication channel; and
overwriting the current value of the dynamic variable in non-volatile memory with the computed update value when the test counter reaches a threshold value.

* * * * *